(12) United States Patent
Maity et al.

(10) Patent No.: US 9,304,783 B2
(45) Date of Patent: Apr. 5, 2016

(54) DIGITAL SIGNAGE MANAGEMENT AND CONTENT DELIVERY SYSTEM AND METHOD THEREOF

(71) Applicant: AMERICAN MEGATRENDS, INC., Norcross, GA (US)

(72) Inventors: Sanjoy Maity, Snellville, GA (US); Baskar Parthiban, Johns Creek, GA (US); Varadachari Sudan Ayanam, Suwanee, GA (US); Samvinesh Christopher, Suwanee, GA (US); Joseprabu Inbaraj, Suwanee, GA (US); Chandrasekar Rathineswaran, Tamil Nadu (IN); Blake Yang, Taipei (TW)

(73) Assignee: AMERICAN MEGATRENDS, INC., Norcross, GA (US)

( * ) Notice: Subject to any disclaimer, the term of this patent is extended or adjusted under 35 U.S.C. 154(b) by 589 days.

(21) Appl. No.: 13/890,406

(22) Filed: May 9, 2013

(65) Prior Publication Data
US 2014/0337004 A1    Nov. 13, 2014

(51) Int. Cl.
*G06F 9/44* (2006.01)
*G06F 9/45* (2006.01)
*G06F 9/445* (2006.01)
*G06F 9/455* (2006.01)

(52) U.S. Cl.
CPC .............. *G06F 9/4416* (2013.01); *G06F 9/4401* (2013.01); *G06F 9/445* (2013.01); *G06F 9/455* (2013.01); *G06F 8/65* (2013.01)

(58) Field of Classification Search
CPC ................................................... G06F 9/4416
See application file for complete search history.

(56) References Cited

U.S. PATENT DOCUMENTS

| | | | | |
|---|---|---|---|---|
| 6,701,450 | B1* | 3/2004 | Gold | G06F 11/1417 711/162 |
| 7,424,419 | B1* | 9/2008 | Fike | G06F 13/385 703/23 |
| 7,764,682 | B2* | 7/2010 | Sievert | H04L 12/4633 370/389 |
| 7,827,258 | B1* | 11/2010 | Kalbarga | G06F 13/105 709/219 |
| 8,069,257 | B1* | 11/2011 | Bhatia | G06F 13/105 345/501 |
| 8,359,384 | B2* | 1/2013 | Kalbarga | G06F 13/105 703/23 |
| 9,137,292 | B2* | 9/2015 | Christopher | H04L 67/025 |
| 2003/0191623 | A1* | 10/2003 | Salmonsen | H04L 12/283 703/24 |
| 2003/0200379 | A1* | 10/2003 | Hollingsworth | G06F 3/0607 711/103 |
| 2004/0049797 | A1* | 3/2004 | Salmonsen | G06F 13/40 725/132 |
| 2004/0098244 | A1* | 5/2004 | Dailey | G06F 3/0607 703/24 |
| 2004/0177166 | A1* | 9/2004 | Ellison | G06F 3/0605 709/253 |

(Continued)

*Primary Examiner* — Akash Saxena
(74) *Attorney, Agent, or Firm* — Tim Tingkang Xia, Esq.; Locke Lord LLP (57) ABSTRACT

Aspects of the present disclosure relate to methods of managing and delivering digital media content data. In certain embodiments, a management device in communication to a computing device via a universal serial bus (USB) connector is provided. The management device has a processor, a volatile memory and a non-volatile memory. The non-volatile memory includes a first partition storing a firmware and a second partition. When executed at the processor, the firmware emulates an emulated bootable storage device for the computing device at the USB connector. In response to an access instruction from the computing device to access data stored at an emulated address of the emulated bootable storage device, the management device converts the emulated address to a physical address of the second partition, and accesses the data at the physical address. The data includes digital media content data and a control module configured to play the content data.

20 Claims, 5 Drawing Sheets

(56) References Cited

U.S. PATENT DOCUMENTS

| | | | |
|---|---|---|---|
| 2005/0049848 A1* | 3/2005 | Dai | G06F 3/0605 703/24 |
| 2005/0289229 A1* | 12/2005 | Kim | H04L 67/125 709/223 |
| 2006/0095595 A1* | 5/2006 | Dalton | G06F 1/3209 710/5 |
| 2007/0011491 A1* | 1/2007 | Govindarajan | G06F 21/57 714/27 |
| 2007/0168481 A1* | 7/2007 | Lambert | G06F 13/128 709/223 |
| 2007/0174033 A1* | 7/2007 | Huang | G06F 13/105 703/24 |
| 2008/0005446 A1* | 1/2008 | Frantz | G06F 13/107 710/313 |
| 2008/0104442 A1* | 5/2008 | Diao | G06F 9/4401 714/3 |
| 2008/0263618 A1* | 10/2008 | White | H04N 7/17318 725/133 |
| 2009/0063694 A1* | 3/2009 | Foo | H04N 21/4126 709/231 |
| 2009/0164204 A1* | 6/2009 | Norman | G11C 5/04 703/24 |
| 2009/0216520 A1* | 8/2009 | Khan | G06F 9/4411 703/26 |
| 2010/0011055 A1* | 1/2010 | Lin | G06F 13/426 709/203 |
| 2010/0030853 A1* | 2/2010 | Lin | G06F 13/105 709/203 |
| 2010/0228960 A1* | 9/2010 | Huang | G06F 8/65 713/100 |
| 2011/0016466 A1* | 1/2011 | Liu | G06F 17/30067 718/1 |
| 2012/0084552 A1* | 4/2012 | Sakthikumar | G06F 9/4812 713/100 |
| 2012/0311567 A1* | 12/2012 | Tsirkin | G06F 9/45558 718/1 |
| 2013/0031343 A1* | 1/2013 | Chou | G06F 9/4406 713/2 |
| 2014/0108471 A1* | 4/2014 | Liu | G06F 17/30115 707/823 |
| 2014/0337004 A1* | 11/2014 | Maity | G06F 9/4401 703/25 |
| 2015/0331694 A1* | 11/2015 | Balakrishnan | G06F 9/4408 713/2 |
| 2016/0033952 A1* | 2/2016 | Schroeter | G05B 19/048 700/108 |

* cited by examiner

DIGITAL SIGNAGE MANAGEMENT AND CONTENT DELIVERY SYSTEM AND METHOD THEREOF

FIELD

The present disclosure generally relates to digital signage display, and more particularly to a digital signage management and content delivery system and method thereof.

BACKGROUND

Signage display devices are widely used to deliver content in the information broadcasting and advertising areas. Traditionally, signage displays include static display on billboard. However, static signage displays have the disadvantages that (1) they are not easily replaced, (2) their efficiencies are very low, (3) their costs associated are high, (4) their displays are not flexible and their content are fixed, and (5) updating information is difficult. With modern technology particularly in the large LED/LCD display area, digital signage displays are currently widely used due to their easy-to-replace characteristics, high efficiencies, relatively low costs, flexible display content with real-time update ability. Currently, the digital signage displays are used for showing television programming, advertisements, traffic information, directional displays, menus, information, and other messages. Digital signs usually utilize technologies such as simple as a matrix of lighting devices such as light bulbs, LEDs, to as complicated as LCD, LED, plasma displays, or projected images to display content, and can be found in both public and private environments, including retail stores, hotels, restaurants, and corporate buildings, amongst other locations.

Since digital signage content may be both frequently and easily updated, saving the printing and/or construction costs associated with static signage, and also because of the interactive abilities available through the accompanying employment of such real-world interfaces as embedded touch screens, movement detection and image capture devices, it has won wide acceptance in the marketplace.

As discussed above, the digital signage display has the flexibility of the content displayed. However, for a digital signage display system including multiple digital signage displays, it is difficult to manage and to deliver the content. A typical way to update the content displayed by each digital signage display is to connect, from each computing device of the digital signage display, to the content delivery servers on the network to update the content. Thus, the content management and delivery procedure is inefficient and time consuming.

Therefore, heretofore unaddressed needs still exist in the art to address the aforementioned deficiencies and inadequacies.

SUMMARY

One aspect of the present disclosure relates to a method of managing and delivering digital media content data. In certain embodiments, the method includes: providing a management device in communication to a computing device via a universal serial bus (USB) connector, the management device having a processor, a volatile memory and a non-volatile memory, wherein the non-volatile memory comprises a first partition storing a firmware and a second partition; executing, at the processor of the management device, the firmware from the first partition; emulating, by the firmware at the USB connector, an emulated bootable storage device for the computing device; and in response to an access instruction from the computing device to access data stored at an emulated address of the emulated bootable storage device, converting, at the management device, the emulated address to a physical address of the second partition, and accessing the data at the physical address of the second partition, wherein the data comprises digital media content data and a digital signage control module configured to play the digital media content data.

In certain embodiments, the emulated boot storage device is an emulated USB drive.

In certain embodiments, the emulating step of the emulated boot storage device comprises: creating, at the management device, an address map in the volatile memory, wherein the address map stores the emulated address of the data and the corresponding physical address of the second partition for converting the emulated address to the corresponding physical address.

In certain embodiments, the data further includes an operating system (OS) and a boot loader module for the computing device.

In certain embodiments, the method further includes: booting the computing device with the boot loader module and the OS from the emulated bootable storage device; and executing, at the computing device, the digital signage control module from the emulated bootable storage device to play the digital signage content data from the emulated bootable storage device.

In certain embodiments, the booting step of the computing device includes: sending, by the computing device, a boot loader access instruction to the management device to access the boot loader module from the emulated bootable storage device; in response to the boot loader access instruction, loading, at the management device, the boot loader module at the second partition, and sending the boot loader module to the computing device; executing, at the computing device, the boot loader module; sending, by the executed boot loader module at the computing device, an OS reading instruction to the management device to access the OS from the emulated bootable storage device; in response to the OS reading instruction, loading, at the management device, the OS at the second partition, and sending the OS to the computing device; and executing, at the computing device, the OS.

In certain embodiments, the executing step of the digital signage control module includes: sending, at the computing device, an application reading instruction to the management device to access the digital signage control module from the emulated bootable storage device; in response to the application reading instruction, loading, at the management device, the digital signage control module at the second partition, and sending the digital signage control module to the computing device; executing, at the computing device, the digital signage control module; sending, by the executed digital signage control module at the computing device, a content reading instruction to the management device to access the digital media content data from the emulated bootable storage device; in response to the content reading instruction, loading, at the management device, the digital media content data at the second partition, and sending the digital media content data to the computing device; and playing, by the executed digital signage control module at the computing device, the digital media content data on a digital signage board.

In certain embodiments, the data further includes control information corresponding to the digital signage control module and the OS.

In certain embodiments, the method further includes: connecting the management device to a remote server via a network; downloading, at the management device, updated digital media content data from the remote server when the updated digital media content data are available at the remote server; and writing, at the management device, the downloaded updated digital media content data in the second partition of the non-volatile memory.

In certain embodiments, the method further includes: connecting the management device to a remote server via a network; downloading, at the management device, updated application data from the remote server when the updated application data are available at the remote server, wherein the updated application data corresponds to at least one of the updated digital signage control module and the OS; and writing, at the management device, the updated application data in the second partition of the non-volatile memory to replace the corresponding application data, and updating the control information corresponding to the application data in the second partition of the non-volatile memory.

In another aspect, the present disclosure relates to a system of managing and delivering digital media content data, including: a management device in communication to a computing device via a universal serial bus (USB) connector. The management device has a processor, a volatile memory and a non-volatile memory, and the non-volatile memory includes a first partition storing a firmware and a second partition. The firmware, when executed at the processor, is configured to emulate an emulated bootable storage device for the computing device at the USB connector. In response to an access instruction from the computing device to access data stored at an emulated address of the emulated boot storage device, the management device converts the emulated address to a physical address of the second partition, and accesses the data at the physical address of the second partition, wherein the data comprises digital media content data and a digital signage control module configured to play the digital media content data.

In certain embodiments, the firmware is configured to emulate the emulated bootable storage device by creating, at the management device, an address map in the volatile memory, wherein the address map stores the emulated address of the data and the corresponding physical address of the second partition for converting the emulated address to the corresponding physical address.

In certain embodiments, the data further includes an operating system (OS) and a boot loader module for the computing device.

In certain embodiments, the computing device is configured to boot with the boot loader module and the OS from the emulated bootable storage device, and to execute the digital signage control module from the emulated bootable storage device to play the digital signage content data from the emulated bootable storage device.

In certain embodiments, the management device is connected to a remote server via a network. In certain embodiments, the management device is configured to download updated digital media content data from the remote server when the updated digital media content data are available at the remote server, and to write the downloaded updated digital media content data in the second partition of the non-volatile memory.

A further aspect of the present disclosure relates to a management device in communication to a computing device via a universal serial bus (USB) connector. The management device includes a processor, a volatile memory and a non-volatile memory. The non-volatile memory comprises a first partition storing a firmware and a second partition. The firmware, when executed at the processor, is configured to emulate an emulated bootable storage device for the computing device at the USB connector. In response to an access instruction from the computing device to access data stored at an emulated address of the emulated boot storage device, the management device converts the emulated address to a physical address of the second partition, and accesses the data at the physical address of the second partition, wherein the data comprises digital media content data and a digital signage control module configured to play the digital media content data.

In certain embodiments, the firmware is configured to emulate the emulated bootable storage device by creating an address map in the volatile memory, wherein the address map stores the emulated address of the data and the corresponding physical address of the second partition for converting the emulated address to the corresponding physical address.

In certain embodiments, the data further includes an operating system (OS) and a boot loader module for the computing device, and control information corresponding to the digital signage control module and the OS.

In certain embodiments, the firmware is configured to: in response to a boot loader access instruction from the computing device to access the boot loader module from the emulated bootable storage device, load the boot loader module at the second partition, and send the boot loader module to the computing device; in response to an OS reading instruction from the computing device to access the OS from the emulated bootable storage device, load the OS at the second partition, and send the OS to the computing device; in response to an application reading instruction from the computing device to access the digital signage control module from the emulated bootable storage device, load the digital signage control module at the second partition, and send the digital signage control module to the computing device; and in response to a content reading instruction from the computing device to access the digital media content data from the emulated bootable storage device, load the digital media content data at the second partition, and send the digital media content data to the computing device.

In certain embodiments, the management device is connected to a remote server via a network. In certain embodiments, when updated digital media content data are available at the remote server, the firmware is configured to download the updated digital media content data from the remote server, and write the downloaded updated digital media content data in the second partition of the non-volatile memory. In certain embodiments, when the updated application data are available at the remote server, the firmware is configured to download the updated application data from the remote server, write the updated application data in the second partition of the non-volatile memory to replace the corresponding application data, and update the control information corresponding to the application data in the second partition of the non-volatile memory, wherein the updated application data corresponds to at least one of the updated digital signage control module and the OS.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Figure 1:
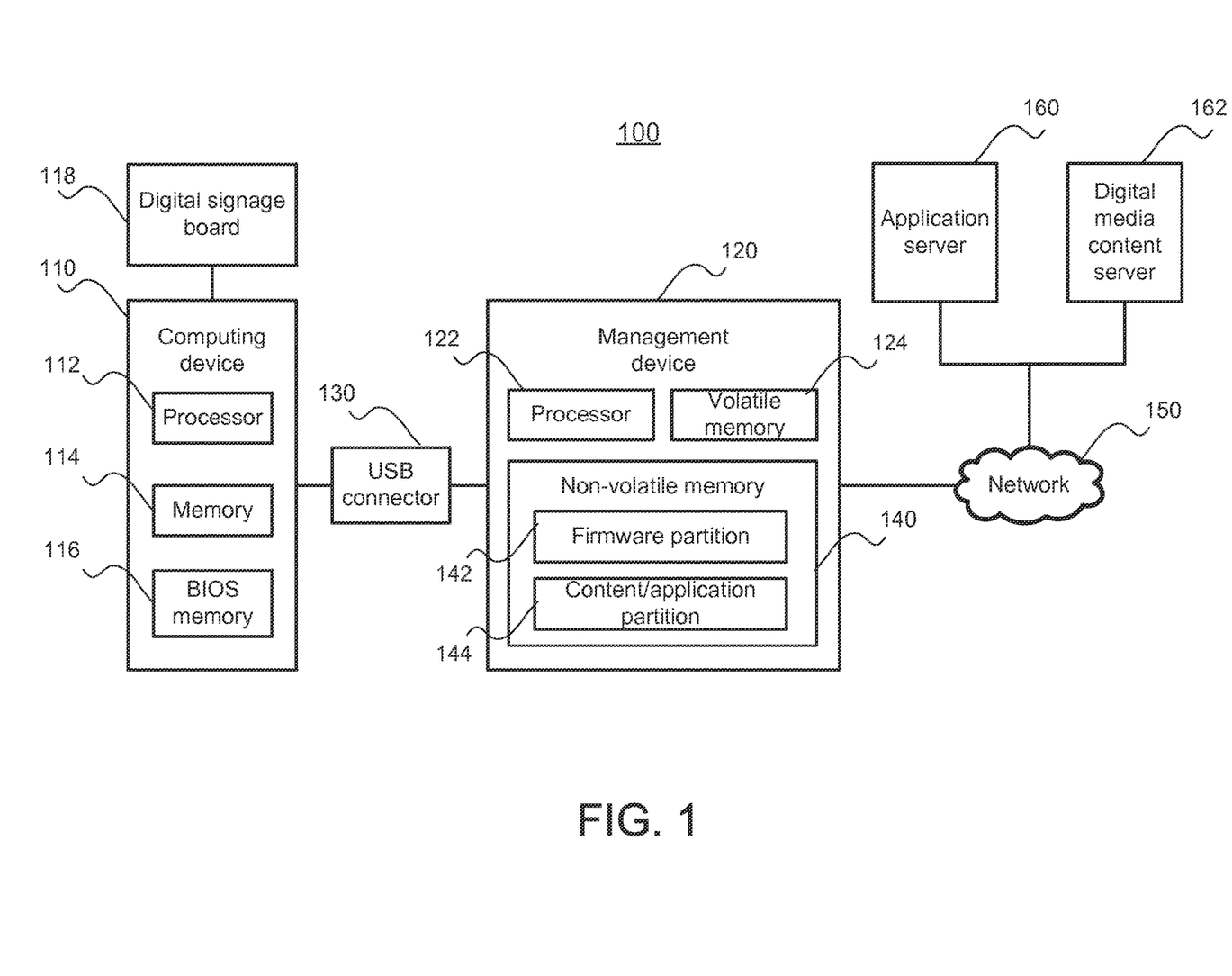
FIG. 1 schematically depicts a system of digital signage management and content delivery according to one embodiment of the present disclosure.

FIG. 1 schematically depicts a system of digital signage management and content delivery according to one embodiment of the present disclosure according to one embodiment of the present disclosure. In certain embodiments, the system 100 is an IPMI based remote management and content delivery system. As shown in FIG. 1, the system 100 includes a computing device 110 and a management device 120. The computing device 110 is connected to the management device 120 via a universal serial bus (USB) connector 130, which is a standard interface. Further, the management device 120 is connected to a plurality of remote servers via a network 150. In certain embodiments, the remote servers may include an application server 160 and a digital media content server 162. It should be appreciated that the system 100 as shown of FIG. 1 only represent an exemplary embodiment of the present disclosure, and therefore should not be considered to limit the disclosure in any manner. In certain embodiments, the system 100 may include other physical or virtual components not shown in FIG. 1.

The computing device 110 is a digital signage control computer. In certain embodiments, the computing device 110 includes a computer motherboard (not shown in FIG. 1). As shown in FIG. 1, components on the computer motherboard of the computing device 110 include a processor 112, a memory 114, and a Basic Input/Output System (BIOS) memory 116. The computing device 110 is also connected to a digital signage board 118. It should be noted that the computing device 110 does not include a storage device. In certain embodiments, the computing device 110 may be a regular computer or a special purpose computer.

The processor 112 is a host processor of the computing device 110, controlling operation and executing instructions of the computing device 110. The memory 114 is a volatile memory storing information in operation, such as the instructions executed by the processor 112. For example, the volatile memory 114 may be a random-access memory (RAM). In certain embodiments, the volatile memory 114 is in communication to the processor 112 through appropriate buses or interfaces, such as serial peripheral interface (SPI) buses. In certain embodiments, the computing device 110 may include more than one processor 112 or more than one volatile memory 114.

The BIOS memory 116 is a non-volatile memory for storing a BIOS. In certain embodiments, the BIOS memory 116 can be an EEPROM chip on the computer motherboard. The BIOS is typically the first code run by the computing device 110 when powered on. In certain embodiments, when the computing device 110 starts up, the first job for the BIOS is the power-on self-test, which initializes and identifies the system devices such as the processor, RAM, video display card, keyboard and mouse, hard disk drive, optical disc drive and other peripheral hardware. The BIOS then detects if there is any peripheral storage device, such as a hard disk or a CD/DVD, connected to the computing device 110. Once the BIOS detects one or more storage device, the BIOS then checks if any of the storage device is bootable, thus designating the device as a "bootable device". If the bootable device is available, the BIOS locates a boot loader module held on the bootable device, and loads and executes the boot loader module, giving it control of the operating system (OS). This process is known as booting, or booting up, which is short for bootstrapping. In certain embodiments, the BIOS memory 116 is in communication to the processor 112 through appropriate buses or interfaces, such as the SPI buses The digital signage board 128 is a content display device for displaying digital media content to viewers. The digital signage board 128 is connected to the computing device 110, and the processor 112 of the computing device 110 executes a digital signage control application to control the digital signage board 128. In certain embodiments, the digital signage board 128 can be positioned at any proper place such that a viewer may see the content displayed by the digital signage board 128. In certain embodiments, the computing device 110 may include a plurality of digital signage boards 128.

The management device 120 is a management and controlling device to control the management system 100. As shown in FIG. 1, the management device 120 includes a processor 122, a volatile memory 124, and a non-volatile memory 140. The management device 120 may be a regular computer, a special purpose computer, or a specialized microcontroller capable of being installed in a computer, such as a service processor (SP) or a baseboard management controller (BMC).

The processor 122 is a host processor of the management system 120, controlling operation and executing instructions of the management system 120. The volatile memory 124 is a temporary memory storing information in operation, such as the instructions executed by the processor 122. For example, the volatile memory 124 may be a random-access memory (RAM). In certain embodiments, the volatile memory 124 is in communication to the processor 122 through appropriate buses or interfaces, such as serial peripheral interface (SPI) buses. In certain embodiments, the management device 120 may include more than one processor 122 or more than one volatile memory 124.

The non-volatile memory 140 is a persistent memory for storing data and instructions even when not powered. For example, the non-volatile memory 140 can be a flash memory. In certain embodiments, the non-volatile memory 140 is in communication to the processor 122 through appropriate buses or interfaces, such as serial peripheral interface (SPI) buses. In certain embodiments, the management device 120 may include more than one non-volatile memory 140.

In certain embodiments, the non-volatile memory 140 can be divided into one or more sections of memory called partitions. Each partition represents one contiguous area of the non-volatile memory 140. When the non-volatile memory 140 includes multiple partitions, the processor 112 may read from one partition while completing a writing/erasing procedure in another partition. This permits reading, writing and erasing code and programming data simultaneously in the same non-volatile memory 140. As shown in FIG. 1, the non-volatile memory 140 is divided into two partitions, including a firmware partition 142 and a content/application partition 144.

Figure 2:
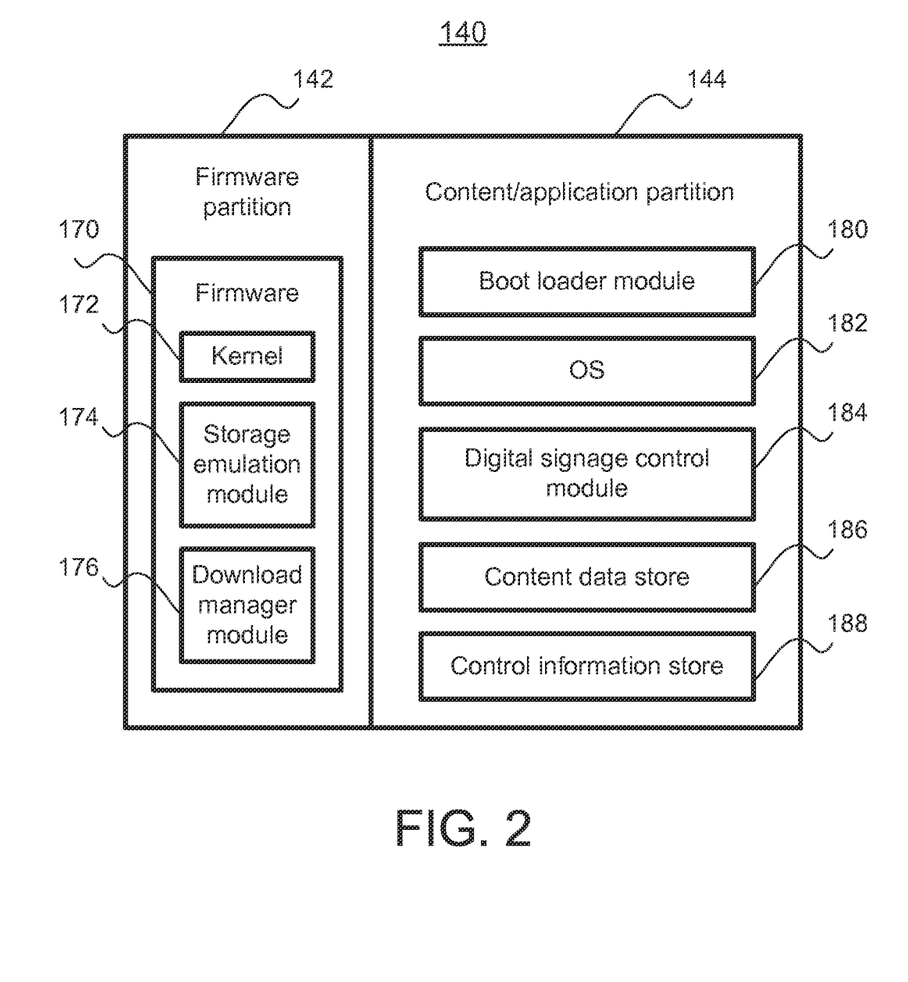
FIG. 2 schematically depicts partitions of the non-volatile memory of the management device according to one embodiment of the present disclosure.

FIG. 2 shows partitions of the non-volatile memory of the management device according to one embodiment of the present disclosure. It should be appreciated that the figures show the partitions in the block form solely for the illustration purposes, and the actual partitions of the flash memory may be different. As shown in FIG. 2, the non-volatile memory 140 includes the firmware partition 142 and the content/application partition 144. Size of each of the partitions 142 and 144 may vary. In certain embodiments, each of the partitions 142 and 144 has the memory size which is enough for the content stored in the partition.

The firmware partition 142 is a partition storing the firmware 170 of the management device 120. The firmware 170 includes all necessary program codes and data for controlling the operation of the management device 120. As shown in FIG. 2, the firmware 170 includes a kernel 172, a storage emulation module 174, and a download manager module 176.

The kernel 172 is the major component of the firmware 170. Typically, the kernel 172 manages the resources of the management device 120, including the communication between hardware and software components. In other words, the kernel 172 is a bridge between other application programs of the management device 120 and the actual data processing done at the hardware level of the management device 120.

The storage emulation module 174 is an application program for emulation of a storage device. In certain embodiments, by executing the storage emulation module 174, the management device 120 may use the volatile memory 124 and the non-volatile memory 140 to emulate a storage device for the computing device 110. In certain embodiments, the storage emulation module 174 can be configured to set up the type of the emulated storage device, such as a hard drive, a floppy drive, an optical drive or a USB disk drive. In other words, from the computing device 110 point of view, the emulated storage device appears to be a physical device attached to the USB connector 130 of the computing device 110. In certain embodiments, when the kernel 172 executes the storage emulation module 174 to create an emulated storage device for the computing device 110, the storage emulation module 174 may use certain memory space in the volatile memory 124 as the emulated storage device, and return data stored in the non-volatile memory 140 as data of the emulated storage device to the computing device 110.

The download manager module 176 is for downloading data from the network 150. In certain embodiments, by executing the download manager module 176, the management device 120 periodically checks the application server 160 and/or the digital media content server 162 via the network 150 for updated application or content data. When the application server 160 includes an updated application data for the management device 140, the download manager module 176 downloads the updated application data via the network 150, and records control information for the updated application data in the control information data store. The control information can be a timestamp indicating the time at which the updated application data are downloaded. The control information can alternatively simply be a flag indicating that the application data has been updated. When the digital media content server 162 includes an updated digital media content data for the management device 140, the download manager module 176 downloads the updated digital media content data via the network 150.

The content/application partition 144 is a partition for emulating a storage device for the computing device 110. In certain embodiments, the content/application partition 144 stores application programs and digital media content for the computing device 110. As shown in FIG. 2, the data stored in the content/application partition 144 includes a boot loader module 180, an operating system (OS) 182, a digital signage control module 184, a content data store 186, and a control information store 188.

The boot loader module 180 is software for booting the computing device 110. When the BIOS of the computing device 110 loads and executes the boot loader module 180 from the emulated storage device, the boot loader module 180 locates the OS 182 at certain address (sector) of the emulated storage device, and loads the OS 182 from the certain address of the emulated storage device to the processor 112 of the computing device 110 to execute the OS 182.

The OS 182 is collective management software managing the operation of the computing device 110. In certain embodiments, the OS 182 includes a file system, which corresponds to the storage device of the computing device 110. When the boot loader module 180 loads and executes the OS 182, the OS 182 operates a file system that supports the emulated file format of the emulated storage device and that reads the file structure of the emulated storage device. Thus, when an application running on the computing device 110 attempts to access a certain file in the file system, the OS 182 may access the file by translating the file path of the certain file to the emulated address of the emulated storage device, and accesses the data of the certain file at the emulated address of the emulated storage device.

The digital signage control module 184 controls the content displayed on the digital signage board 118. In certain embodiments, the digital signage control module 184 loads a media file, and displays the loaded media file on the digital signage board 118. In certain embodiments, when multiple media files exist in the emulated storage device, the digital signage control module 184 may load all media files. In this case, the digital signage control module 184 may display the media files in a variety of ways, such as playing the files in a time sequence, playing the files in a preset prioritized sequence, or randomly playing one of the files. In certain embodiments, the digital signage control module 184 can monitor, through the file system provided by the OS 182, whether there are updated media files available at the emulated storage device. For example, the digital signage control module 184 can periodically check timestamps associated with the media files provided by the file system. Once the digital signage control module 154 detects updated media files, it can reload the media files.

The content data store 186 stores the digital media content data downloaded via the network 150. Specifically, when the download manager module 176 downloads an updated digital media content data via the network 150, the updated digital media content data are stored in the content data store 186 as a media file, and the media file is automatically available to the computing device 110 through the file system of the emulated storage device 126. It should be appreciated that the content data store 186 may store more than one media files. In certain embodiments, the download manager module 176 may downloads a new updated media file via the network 150 to replace one of the existing media files in the content data store 186. To replace an existing media file in the content data store 186, the download manager module 176 checks if the existing media file is in use (i.e., the computing device 110 is loading the existing media file). When the existing media file is not in use, the download manager module 176 downloads the updated media file via the network 150, and the new media file may replace the existing media file in the content data store 186.

The control information store 188 stores the control information for the updated application data. The control information indicates the application data are updated. For example, the control information may include an update flag, a timestamp showing the time of the updated application data, or other data files marking the update information of the application data.

When the download manager module 176 downloads an updated application data via the network 150, the download manager module 176 stores the updated application data in the area where the existing application is stored, and updates the control information corresponding to the application data in the control information data store 188. For example, when an updated OS is available at the application server 160, the download manager module 176 downloads the updated OS from the application server 160 to replace the OS 182, and updates the control information (i.e. the update flag or the timestamp) corresponding to the OS 182 in the control information store 188. When an updated digital signage control module is available at the application server 160, the download manager module 176 downloads the updated digital signage control module from the application server 160 to replace the digital signage control module 184, and updates the control information (i.e. the update flag or the timestamp) corresponding to the digital signage control module 184 in the control information store 188.

When the computing device 110 runs the digital signage control module 184, the digital signage control module 184 periodically checks the control information store 188 for the control information of the application data. If any of the control information data show that the application data has been updated, the digital signage control module 184 can issue a command to reboot the computing device 110. Therefore, the updated version of the OS or application is loaded in the next booting.

The USB connector 130 is a standard connecting interface under the USB industry standard. USB was designed to standardize the connection of computer peripheral devices, including keyboards, pointing devices, digital cameras, printers, portable media players, disk drives and network adapters, to personal computers. The USB connector can be used to communicate between the devices and to supply electric power from one device to another.

The network 150 is a communication network between the management device 120 and the remote servers, including the application server 160 and the digital media content server 162. In certain embodiments, the network 150 may include wired or wireless network, and may be in the form of a mobile communication network 105, the Internet, the local area network (LAN), the wide area network (WAN), or a personal area network (PAN). The mobile communication network is a radio network system distributed over land areas called cells, and generally includes GSM, GPRS, HSPA, CDMA, WCDMA, WiMAX, LTE, satellite communication and many other mobile network systems. The PAN is a computer network system used for communication among computerized devices, which includes Wi-Fi, Zigbee, and Bluetooth networks. In certain embodiments, the network 150 may be a cloud network.

The remote servers include an application server 160 and a digital media content server 162. The application server 160 is a remote server providing updated applications for the management device 120 and the computing device 110. In certain embodiments, the updated applications may include the firmware 170, the boot loader module 180, the OS 182, and the digital signage control module 184. The digital media content server 162 is a remote server providing updated digital media content data for the management device 120. In certain embodiments, the application server 160 and the digital media content server 162 may be formed in one physical server. In certain embodiments, the remote servers may include more than one application server 160 and more than one digital media content server 162.

Figure 3:
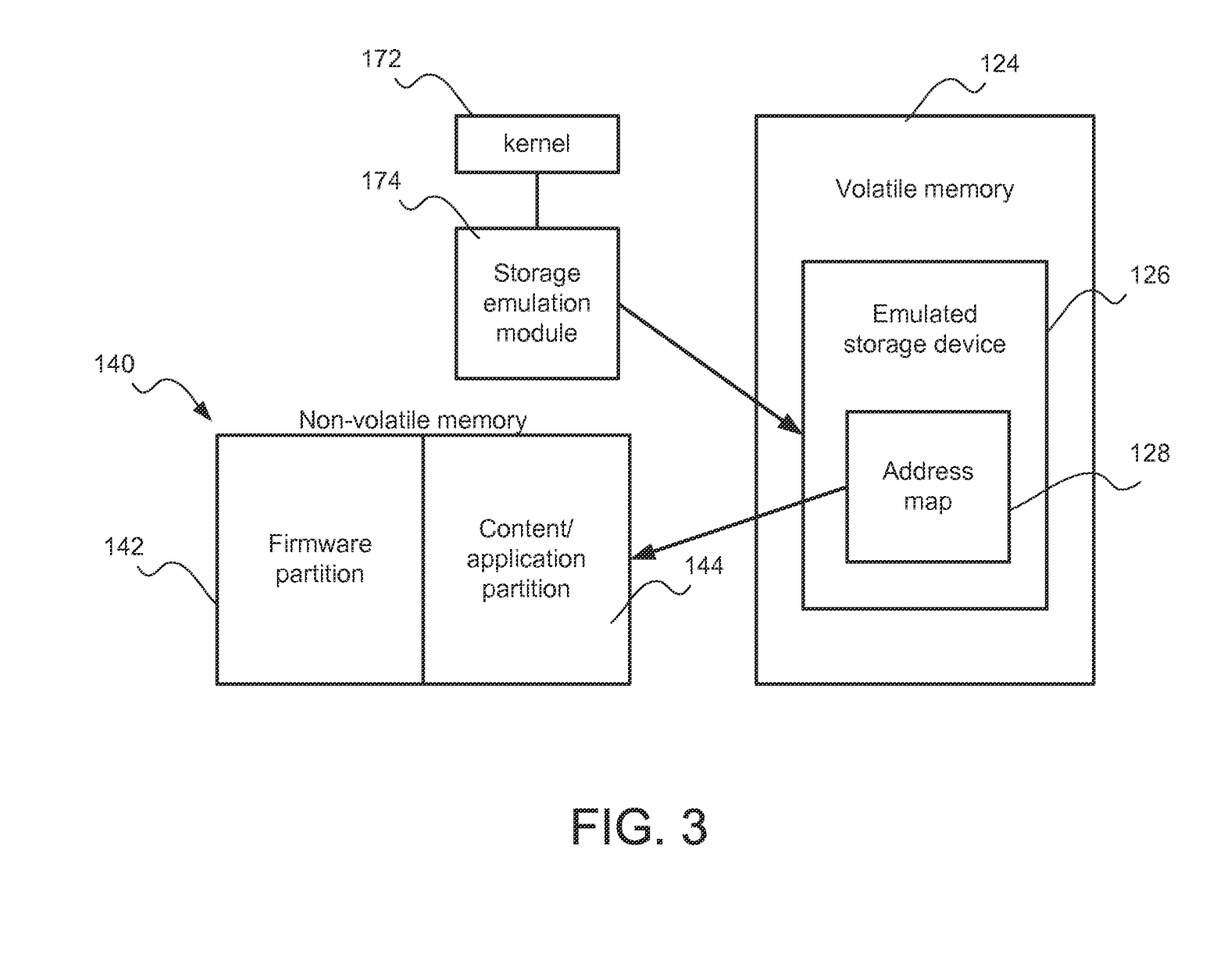
FIG. 3 schematically depicts emulating a storage device using the volatile memory and the non-volatile memory of the management device according to one embodiment of the present disclosure.

FIG. 3 schematically depicts emulating a storage device using the volatile memory and the non-volatile memory of the management device according to one embodiment of the present disclosure. As shown in FIG. 3, when the kernel 172 of the management device 120 launches the storage emulation module 174, the storage emulation module 174 emulates a USB storage that contains the data of the content/application partition in units to the computing device 110 through the USB connector 130. In certain embodiments, the storage emulation module 174 creates an address map 128. The address map 128 is a conversion map between the emulated address of the emulated storage device 126 and the corresponding physical address of the content/application partition 144 of the non-volatile memory 140. Thus, when the emulated storage device 172 receives from the USB connector an instruction to access certain data at an emulated address, the storage emulation module 174 may process the instruction by converting the emulated address of the emulated storage device 126 to the corresponding physical address of the content/application partition 144 of the non-volatile memory 140 according to the address map 128. Thus, the storage emulation module 174 may access the data at the corresponding physical address of the content/application partition 144 of the non-volatile memory 140, and return the accessed data in response to the instruction.

Figure 4:
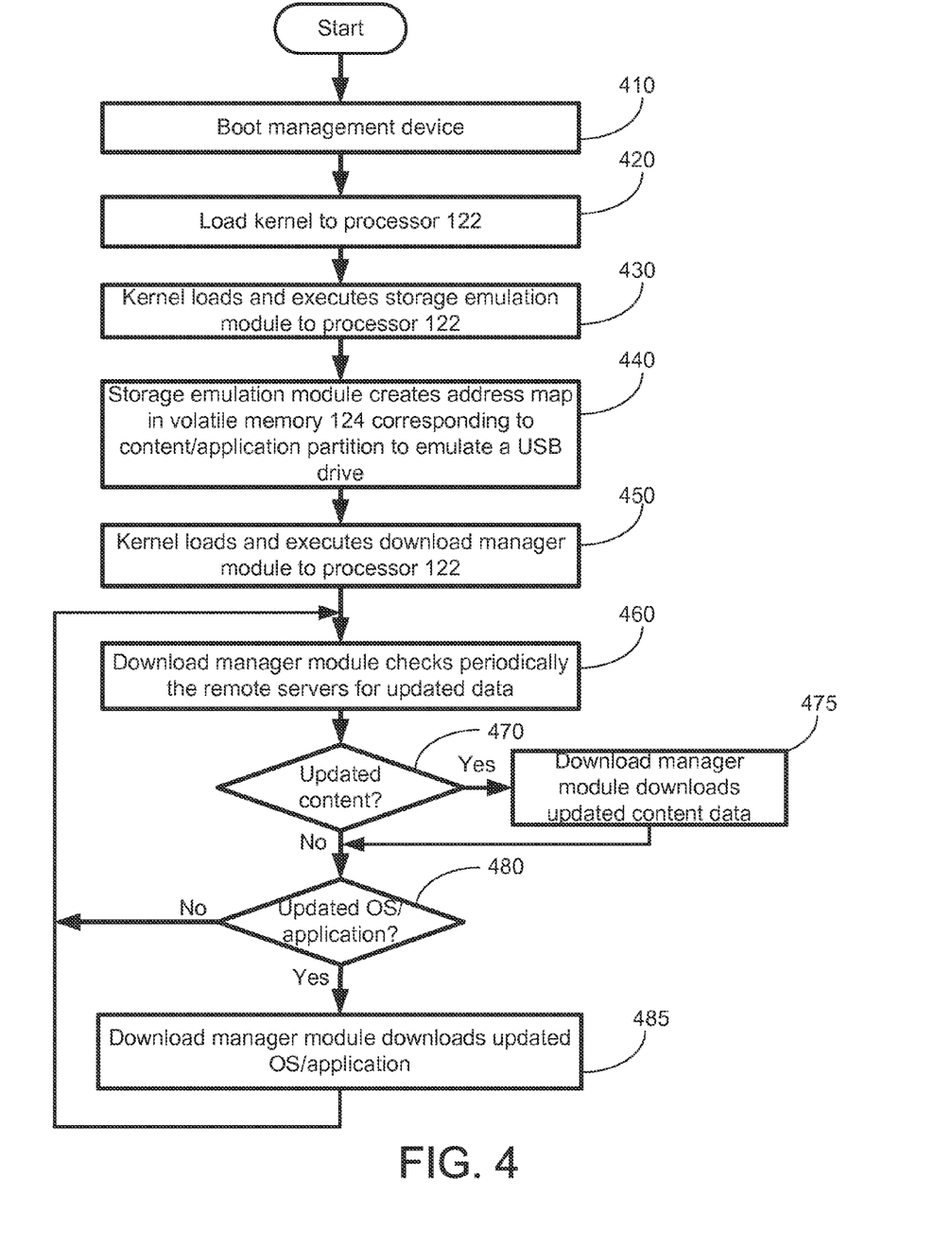
FIG. 4 shows an exemplary flow chart of the operation of the management device according to one embodiment of the present disclosure.

FIG. 4 shows an exemplary flow chart of the operation of the management device according to one embodiment of the present disclosure. As shown in FIG. 4, at operation 410, the management device 120 is booted. At operation 420, to control the operation of the management device 120, the management device 120 loads the kernel 172 of the firmware 170 from the firmware partition 142 to the processor 122 of the management device 120. At operation 430, the kernel 172 loads the storage emulation module 174 to the processor 122 to emulate the emulated storage device 126. In certain embodiments, the emulated storage device 126 is a USB drive because the management device 120 is connected to the computing device 110 through the USB connector 130. Then, at operation 440, the storage emulation module 174 creates the address map 128 corresponding to the content/application partition 144. In this way, the emulated USB drive 126 can provide data of the content/application partition 144 through the USB connector 130.

Then, at operation 450, the kernel 172 loads and executes the download manager module 176 of the firmware 170 from the firmware partition 142 to the processor 122 of the management device 120. At operation 460, the download manager module 176 checks periodically the remote servers (the application server 160 and the digital media content server 162) via the network 150 for updated data. At operation 470, when the digital media content server 162 includes updated content data, the download manager module 176 enters operation 475. At operation 475, the download manager module 176 downloads the updated content data from the digital media content server 162 via the network 150. The download manager module 176 then stores the updated content data in the content data store 186 of the content/application partition 144. In certain embodiments, the updated content data may include one or more media files. When there is no updated content data in the digital media content server 162, the download manager module 176 enters operation 480.

At operation 480, when the application server 160 includes updated OS and/or application data, the download manager module 176 enters operation 485. At operation 485, the download manager module 176 downloads the updated OS and/or application data from the application server 160 via the network 150. The download manager module 176 then stores the updated OS and/or application data in the content/application partition 144, and updates the control information corresponding to the updated OS and/or application data in the control information store.

It should be appreciated that the operation of the management device 120 as shown in FIG. 4 can be performed regardless of the operation of the computing device 110. In other words, the operation of the management device 120 may be performed when the computing device 110 is powered off.

Figure 5:
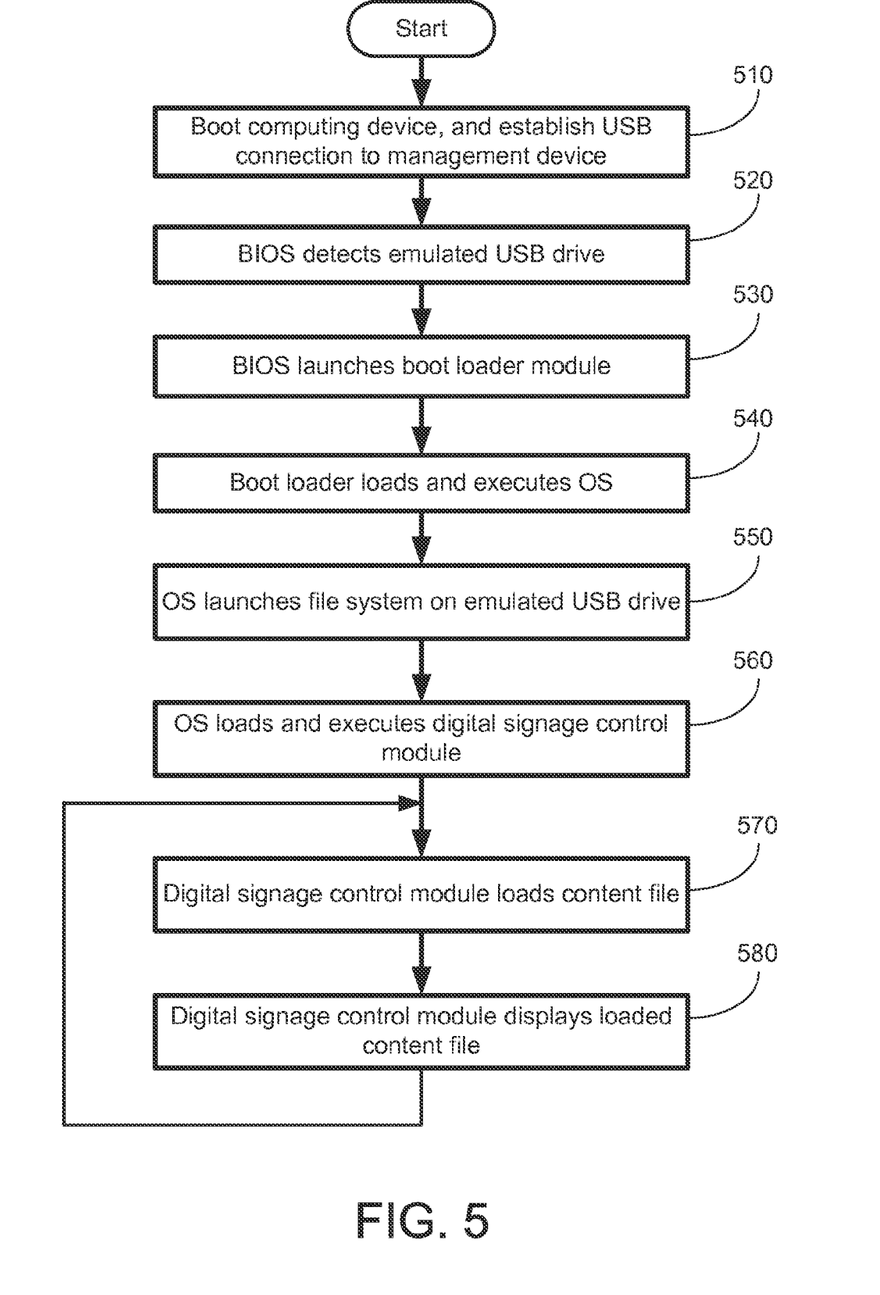
FIG. 5 shows an exemplary flow chart of the operation of the computing device according to one embodiment of the present disclosure.

FIG. 5 shows an exemplary flow chart of the operation of the computing device according to one embodiment of the present disclosure. As described above, the computing device 110 may or may not include a storage device. By emulation of the management device 120 as an emulated storage device, the computing device may access the emulated storage device as a bootable device, and use the OS 182 and the application provided in the content/application partition 144 of the non-volatile memory 140 to perform operation.

At operation 510, the computing device 110 is booted to establish the USB connection to the management device 120. In the booting process, the BIOS stored in the BIOS memory 116 is launched. At this time, the storage emulation module 174 is running on the management device 120 to emulate a USB drive. Thus, the computing device 110 is connected to the emulated USB drive as a bootable device.

At operation 520, the BIOS detects the emulated USB drive as a bootable device. At operation 530, the BIOS loads the boot loader module 180 from the emulated USB drive and launches the boot loader module 180. Specifically, the BIOS sends a reading instruction of the boot loader module 180 to the emulated USB drive via the USB connector 130. The reading instruction has an emulated address corresponding to the boot loader module 180 in the emulated USB drive. At the management device 120, the kernel 172 receives the reading instruction and sends the reading instruction to the storage emulation module 174. Upon receiving the reading instruction, the storage emulation module 174 converts the emulated address corresponding to the boot loader module 180 to the physical address of the boot loader module 180 stored in the content/application partition 144 of the non-volatile memory 140 according to the address map. Then, the storage emulation module 174 loads the boot loader module 180 at the physical address of the content/application partition 144, and sends the boot loader module 180 to the kernel 172. The kernel 172 then sends the boot loader module 180 back to the BIOS at the computing device 110 via the USB connector 130. The BIOS then executes the boot loader module 180 to launch the boot loader.

At operation 540, the boot loader loads and executes the OS 182. Specifically, the boot loader sends a reading instruction of the OS 182 to the emulated USB drive via the USB connector 130. At the management device 120, the kernel 172 receives the reading instruction and sends the reading instruction to the storage emulation module 174. Upon receiving the reading instruction, the storage emulation module 174 converts the emulated address corresponding to the OS 182 to the physical address of the OS 182 stored in the content/application partition 144 of the non-volatile memory 140 according to the address map. Then, the storage emulation module 174 loads the OS 182 at the physical address of the content/application partition 144, and sends the OS 182 to the kernel 172. The kernel 172 then sends the OS 182 back to the boot loader at the computing device 110 via the USB connector 130. The boot loader then executes the OS 182 to launch the OS.

At operation 550, when the OS is running on the computing device, the OS launches the file system on the emulated USB drive. Thus, the OS and any application running on the OS may access the files stored in the emulated USB drive through the file system. When an application intends to access a file stored in the emulated USB drive, the application sends a file access instruction to the OS. The file access instruction includes a file path of the file being access. The OS then translates the file path of the file to the emulated address of the emulated storage device, and sends a reading instruction for the data corresponding to the file at the emulated address of the emulated storage device.

At operation 560, the OS loads the digital signage control module 184 from the emulated USB drive, and executes the digital signage control module 184. Specifically, the OS converts a file path of the digital signage control module 184 in the file system to the corresponding emulated address of the emulated storage device. The OS then sends a reading instruction of the digital signage control module 184 to the emulated USB drive via the USB connector 130. The reading instruction includes the corresponding emulated address of the digital signage control module 184 in the emulated storage device. At the management device 120, the kernel 172 receives the reading instruction and sends the reading instruction to the storage emulation module 174. Upon receiving the reading instruction, the storage emulation module 174 converts the emulated address corresponding to the digital signage control module 184 to the physical address of the digital signage control module 184 stored in the content/application partition 144 of the non-volatile memory 140 according to the address map. Then, the storage emulation module 174 loads the digital signage control module 184 at the physical address of the content/application partition 144, and sends the digital signage control module 184 to the kernel 172. The kernel 172 then sends the digital signage control module 184 back to the OS running on the computing device 110 via the USB connector 130. The OS then executes the digital signage control module 184 to launch the digital signage control module 184.

Then, at operation 570, the digital signage control module loads the media file from the emulated storage device. Specifically, the digital signage control module sends the file path of the media file to the OS. The OS converts the file path of the media file in the file system to the corresponding emulated address of the emulated storage device. The OS then sends a reading instruction of the content data to the emulated USB drive via the USB connector 130. The reading instruction includes the corresponding emulated address of the content data in the emulated storage device. At the management device 120, the kernel 172 receives the reading instruction and sends the reading instruction to the storage emulation module 174. Upon receiving the reading instruction, the storage emulation module 174 converts the emulated address corresponding to the content data to the physical address of the content data stored in the content data store 186 of the content/application partition 144 of the non-volatile memory 140 according to the address map. Then, the storage emulation module 174 loads the content data at the respective physical addresses of the content/application partition 144, and sends the content data to the kernel 172. The kernel 172 then sends the content data back to the OS running on the computing device 110 via the USB connector 130. The OS then sends the content data in the file format to the executing digital signage control application, and enters operation 580.

At operation 580, the digital signage control module displays the loaded media file on the digital signage board 118. As discussed above, the content data may include more than one media file. In this case, the digital signage control module may display the media files in a variety of ways, such as playing the files in a time sequence, playing the files in a preset prioritized sequence, or randomly playing one of the files. When the digital signage control module finishes displaying the media files, the digital signage control module goes back to operation 570 to reload the media file.

As described above, the management device 120 emulates a bootable USB drive for the computing device 110. When the download manager module 176 of the management device 120 downloads the OS 182 and the digital signage control module 184 for update, the computing device 110 may require rebooting to operate on the new OS and application. The rebooting process may be automatic or manual. Specifically, the digital signage control module 184 may periodically check, from the emulated storage, the control information store 188 to determine whether there are updated application data available. When any of the control information data show that the application data (OS or other application) has been updated, the digital signage control module 184 issues a command to reboot the computing device 110 such that the computing device 110 launches the updated OS and application.

The foregoing description of the example of the system and method of managing and delivering digital media content software has been presented only for the purposes of illustration and description and is not intended to be exhaustive or to limit the disclosure to the precise forms disclosed. Many modifications and variations are possible in light of the above teaching.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A method of managing and delivering digital media content data, comprising:
    providing a management device in communication to a computing device via a universal serial bus (USB) connector, the management device having a processor, a volatile memory and a non-volatile memory, wherein the non-volatile memory comprises a first partition storing firmware and a second partition storing data;
    executing, at the processor of the management device, the firmware from the first partition;
    emulating, by the firmware at the USB connector, an emulated bootable storage device for the computing device; and
    in response to an access instruction from the computing device to access data stored at an emulated address of the emulated bootable storage device, converting, at the management device, the emulated address to a physical address of the second partition, and accessing the data at the physical address of the second partition, wherein the data comprises digital media content data and a digital signage control module configured to play the digital media content data.

2. The method as claimed in claim 1, wherein the emulated boot storage device is an emulated USB drive.

3. The method as claimed in claim 1, wherein the emulating step of the emulated boot storage device comprises:
    creating, at the management device, an address map in the volatile memory, wherein the address map stores the emulated address of the data and the corresponding physical address of the second partition for converting the emulated address to the corresponding physical address.

4. The method as claimed in claim 1, wherein the data further comprises an operating system (OS) and a boot loader module for the computing device.

5. The method as claimed in claim 4, further comprising:
    booting the computing device with the boot loader module and the OS from the emulated bootable storage device; and
    executing, at the computing device, the digital signage control module from the emulated bootable storage device to play the digital signage content data from the emulated bootable storage device.

6. The method as claimed in claim 5, wherein the booting step of the computing device comprises:
    sending, by the computing device, a boot loader access instruction to the management device to access the boot loader module from the emulated bootable storage device;
    in response to the boot loader access instruction, loading, at the management device, the boot loader module at the second partition, and sending the boot loader module to the computing device;
    executing, at the computing device, the boot loader module;
    sending, by the executed boot loader module at the computing device, an OS reading instruction to the management device to access the OS from the emulated bootable storage device;
    in response to the OS reading instruction, loading, at the management device, the OS at the second partition, and sending the OS to the computing device; and
    executing, at the computing device, the OS.

7. The method as claimed in claim 5, wherein the executing step of the digital signage control module comprises:
    sending, at the computing device, an application reading instruction to the management device to access the digital signage control module from the emulated bootable storage device;
    in response to the application reading instruction, loading, at the management device, the digital signage control module at the second partition, and sending the digital signage control module to the computing device;
    executing, at the computing device, the digital signage control module;
    sending, by the executed digital signage control module at the computing device, a content reading instruction to the management device to access the digital media content data from the emulated bootable storage device;
    in response to the content reading instruction, loading, at the management device, the digital media content data at the second partition, and sending the digital media content data to the computing device; and
    playing, by the executed digital signage control module at the computing device, the digital media content data on a digital signage board.

8. The method as claimed in claim 4, wherein the data further comprises control information corresponding to the digital signage control module and the OS.

9. The method as claimed in claim 8, further comprising:
    connecting the management device to a remote server via a network;
    downloading, at the management device, updated digital media content data from the remote server when the updated digital media content data are available at the remote server; and
    writing, at the management device, the downloaded updated digital media content data in the second partition of the non-volatile memory.

10. The method as claimed in claim 8, further comprising:
    connecting the management device to a remote server via a network;
    downloading, at the management device, updated application data from the remote server when the updated application data are available at the remote server, wherein the updated application data corresponds to at least one of the updated digital signage control module and the OS; and
    writing, at the management device, the updated application data in the second partition of the non-volatile memory to replace the corresponding application data, and updating the control information corresponding to the application data in the second partition of the non-volatile memory.

11. A system of managing and delivering digital media content data, comprising:
a management device in communication to a computing device via a universal serial bus (USB) connector, the management device having a processor, a volatile memory and a non-volatile memory, wherein the non-volatile memory comprises a first partition storing firmware and a second partition storing data, wherein the firmware, when executed at the processor, is configured to emulate an emulated bootable storage device for the computing device at the USB connector;
wherein, in response to an access instruction from the computing device to access data stored at an emulated address of the emulated boot storage device, the management device converts the emulated address to a physical address of the second partition, and accesses the data at the physical address of the second partition, wherein the data comprises digital media content data and a digital signage control module configured to play the digital media content data.

12. The system as claimed in claim 11, wherein the firmware is configured to emulate the emulated bootable storage device by creating, at the management device, an address map in the volatile memory, wherein the address map stores the emulated address of the data and the corresponding physical address of the second partition for converting the emulated address to the corresponding physical address.

13. The system as claimed in claim 11, wherein the data further comprises an operating system (OS) and a boot loader module for the computing device.

14. The system as claimed in claim 13, wherein the computing device is configured to boot with the boot loader module and the OS from the emulated bootable storage device, and to execute the digital signage control module from the emulated bootable storage device to play the digital signage content data from the emulated bootable storage device.

15. The system as claimed in claim 11, wherein the management device is connected to a remote server via a network, wherein the management device is configured to download updated digital media content data from the remote server when the updated digital media content data are available at the remote server, and to write the downloaded updated digital media content data in the second partition of the non-volatile memory.

16. A management device in communication to a computing device via a universal serial bus (USB) connector, the management device comprising:
a processor;
a volatile memory; and
a non-volatile memory, wherein the non-volatile memory comprises a first partition storing firmware and a second partition storing data, wherein the firmware, when executed at the processor, is configured to emulate an emulated bootable storage device for the computing device at the USB connector;
wherein, in response to an access instruction from the computing device to access data stored at an emulated address of the emulated boot storage device, the management device converts the emulated address to a physical address of the second partition, and accesses the data at the physical address of the second partition, wherein the data comprises digital media content data and a digital signage control module configured to play the digital media content data.

17. The management device as claimed in claim 16, wherein the firmware is configured to emulate the emulated bootable storage device by creating an address map in the volatile memory, wherein the address map stores the emulated address of the data and the corresponding physical address of the second partition for converting the emulated address to the corresponding physical address.

18. The management device as claimed in claim 16, wherein the data further comprises an operating system (OS) and a boot loader module for the computing device, and control information corresponding to the digital signage control module and the OS.

19. The management device as claimed in claim 18, wherein the firmware is configured to:
in response to a boot loader access instruction from the computing device to access the boot loader module from the emulated bootable storage device, load the boot loader module at the second partition, and send the boot loader module to the computing device;
in response to an OS reading instruction from the computing device to access the OS from the emulated bootable storage device, load the OS at the second partition, and send the OS to the computing device;
in response to an application reading instruction from the computing device to access the digital signage control module from the emulated bootable storage device, load the digital signage control module at the second partition, and send the digital signage control module to the computing device; and
in response to a content reading instruction from the computing device to access the digital media content data from the emulated bootable storage device, load the digital media content data at the second partition, and send the digital media content data to the computing device.

20. The management device as claimed in claim 18, wherein the management device is connected to a remote server via a network, and wherein the firmware is configured to:
when updated digital media content data are available at the remote server, download the updated digital media content data from the remote server, and write the downloaded updated digital media content data in the second partition of the non-volatile memory; and
when the updated application data are available at the remote server, download the updated application data from the remote server, write the updated application data in the second partition of the non-volatile memory to replace the corresponding application data, and update the control information corresponding to the application data in the second partition of the non-volatile memory, wherein the updated application data corresponds to at least one of the updated digital signage control module and the OS.

* * * * *